United States Patent
Wang et al.

(10) Patent No.: US 7,433,387 B2
(45) Date of Patent: Oct. 7, 2008

(54) MULTIPLE CODE-SET CHANNEL ESTIMATION METHOD IN TIME-SLOTTED CDMA SYSTEM

(75) Inventors: Yingmin Wang, Beijing (CN); Shiyan Ren, Beijing (CN)

(73) Assignee: Da Tang Mobile Communications Equipment Co., Ltd. (CN)

( * ) Notice: Subject to any disclaimer, the term of this patent is extended or adjusted under 35 U.S.C. 154(b) by 524 days.

(21) Appl. No.: 11/181,687

(22) Filed: Jul. 14, 2005

(65) Prior Publication Data

US 2005/0286613 A1   Dec. 29, 2005

Related U.S. Application Data

(63) Continuation of application No. PCT/CN2004/000064, filed on Jan. 17, 2004.

(30) Foreign Application Priority Data

Jan. 21, 2003   (CN) ................ 03 1 00670

(51) Int. Cl.
*H04B 1/00* (2006.01)
(52) U.S. Cl. ............ 375/148; 375/144; 375/147; 375/340; 370/210; 370/335; 370/342
(58) Field of Classification Search ............. 375/147, 375/148, 144, 137, 340; 370/210, 335, 342
See application file for complete search history.

(56) References Cited

U.S. PATENT DOCUMENTS

| | | | |
|---|---|---|---|
| 6,996,194 B2 * | 2/2006 | Pukkila et al. | 375/340 |
| 7,260,056 B2 * | 8/2007 | Pan et al. | 370/210 |
| 7,289,552 B2 * | 10/2007 | Kwak et al. | 375/147 |
| 2001/0004390 A1 | 6/2001 | Pukkila et al. | |
| 2002/0181557 A1 | 12/2002 | Fujii | |

FOREIGN PATENT DOCUMENTS

| CN | 1304255 A | 7/2001 |
|---|---|---|
| EP | 1107524 A2 | 6/2001 |

* cited by examiner

*Primary Examiner*—Ted Wang

(57) ABSTRACT

A channel estimation method for multiple code-sets in a time-slotted CDMA system. The method includes: A) performing a single code-set channel estimation of the received signal of each code-set, respectively, to obtain an original channel estimation, and deciding whether the desired number of iterations is reached; if yes, outputting each single code-set channel estimate; otherwise, going to Step B; B) performing limited time decision for the original channel estimates, retaining taps of channel estimation that meet a certain condition, recovering the interference caused by the response of each code-set using the tap values; canceling the interference caused by the response of other code-sets in the received signal of each code-set to obtain a clean signal of each code-set; taking the clean signal of each code-set as the said received signal of each code-set; and returning to Step A. The method solves the channel estimation problem caused by response signals of multiple code-sets and improves performance of single-code-set channel estimation.

10 Claims, 2 Drawing Sheets

MULTIPLE CODE-SET CHANNEL ESTIMATION METHOD IN TIME-SLOTTED CDMA SYSTEM

CROSS-REFERENCE TO RELATED APPLICATIONS

This application is a continuation of International Application No. PCT/CN2004/000064, filed on Jan. 17, 2004. This application claims the benefit of Chinese Application No. 03100670.1, filed on Jan. 21, 2003. The disclosures of the above applications are incorporated herein by reference.

FIELD OF THE INVENTION

The present invention relates to the channel estimation technique in a mobile communication system, and specifically, to a channel estimation method with multiple code-sets and multiple users applicable to a time-slotted CDMA wireless communication system.

BACKGROUND OF THE INVENTION

Complexity and time varying nature of channels are the most obvious characteristics of wireless mobile communications. During a coherent reception, it is necessary to estimate and measure channels at a receiving end, and then perform coherent detection with the obtained channel responses. Besides, the channel estimation is also used in measurement of physical layer, smart antenna, rapid control, handover and management of radio resource etc.

In a time-slotted CDMA cellular mobile communication system, symbols for channel estimation as well as data are transmitted in the Time Division Duplex (TDD) mode while transmissions in different cells are synchronized in the same time-slots.

An example of a burst structure in a TD-SCDMA system is shown in FIG. 1. The middle of burst structure is the midamble, which is used for channel estimation, so it is also called the channel estimation code. Both sides of the midamble are used for transmitting data symbols.

The midamble, i.e. channel estimation code is generated as follows: for the same time-slot of the same cell, one midamble is given as a basic code, and different users take different versions of the same basic code generated by shifting cyclically as their midambles. The K midambles $m_P^{(k)}$ generated from the same basic code $m_P$, $k=1, \ldots K$, constitute a set, which is called a midamble set, or briefly, a code-set. In the TD-SCDMA system, the basic code has 128 chips, and length of the generated midamble Lm=128+16 chips.

The channel estimation method for a time-slotted CDMA system is called Steiner Estimator, which is described in the article: B. Steiner and P. W. Baier, "Low Cost Channel Estimation in the Uplink Receiver of CDMA Mobile Radio Systems," FREQUENZE, 47(1993) 11-12. The specific estimation procedure is described as follows.

Suppose the channel response vector of each user is $h^{(k)}$:

$$h^{(k)} = (h_1^{(k)}, h_2^{(k)}, \ldots, h_W^{(k)})^T \quad (1)$$

where W, the window length, represents the time width of the channel response; and the channel response vector $h^{(k)}$ is represented with values of W taps at a chip interval. In this case, the number of taps of the midamble response signal is Lm+W−1. Since the midamble and data symbols are continuously transmitted, the first W−1 tap values of midamble response signal are affected by the data symbols in front, and the last W−1 tap values of the midamble response signal are overlapped by the data symbols behind. Take P chips at the middle of the burst as observed values and the vector is represented as:

$$e_{mid} = (e_1, e_2, \ldots, e_P) \quad (2)$$

Based on the generation characteristics of midambles in a code-set for multiple users, the midamble response signals received at the receiving side is represented as:

$$e_{mid} = Gh + n \quad (3)$$

where n is noise and interference, and h is total channel response vectors for all users:

$$h = (h^{(1)T}, h^{(2)T}, \ldots, h^{(K)T})^T \quad (4);$$

G is a circle matrix:

$$G = (\text{circle}(g_1, g_2, \ldots, g_P))^T \quad (5)$$

where $g = (g_1, g_2, \ldots, g_P)$ is the first column of Matrix G, and is defined by the basic code that is used for generating the code-set.

The task of channel estimation is to solve equation (3) in order to obtain the unknown h. Based on the maximum likelihood method, the channel estimate $\hat{h}$ can be obtained with the following simplified equation:

$$\hat{h} = G^{-1} e_{mid} \quad (6)$$

Since G is a circle matrix, the operation of equation (6) can be made by means of Discrete Fourier transform (DFT) and Inverse Discrete Fourier transform (IDFT):

$$\hat{h} = IDFT\left(\frac{DFT(e_{mid})}{DFT(g)}\right) \quad (7)$$

where the DFT (g) can be obtained by offline calculation in advance.

With less computation cost, the channel estimation method mentioned above obtains the channel estimates for multiple users belonging to the same code-set, and suppresses the interference among midambles of multiple users generated from the same basic code. This is a channel estimation method in connection with multi-user midambles in a code set based on one same basic code, that is, a single code-set channel estimation method.

As the single code-set channel estimation method processes signals other than the response signal of the own code-set that are overlapped at the same time period as white Gaussian noise, the method itself is imperfect. Besides, for the time-slotted CDMA systems operating in cell synchronization, signals of adjacent cell users who are located at the boundary of the local cell receive strong interferences from signals of the local cell while signals of adjacent cells transmitted in the same frequency as the signals of the local cell are synchronized with the signals thereof in a time-slot. In other words, the primary interference of the midamble responses code-set of the local cell is caused by the other code sets of the adjacent cells, since they are synchronized at the same time-slot as well as the same frequency. In some other cases, it is possible that midamble responses of multiple code-sets with approximately equal power are overlapped.

For example, in a multiple receiving-antennas situation, the single code-set channel estimation method not only limits the performance of the multiple receiving-antennas system, but also worsens the performance of such subsystem as beamforming transmission, measurement of physical layer, synchronization and power control. In another example, when there are users of adjacent cells operate at the boundary of the cells in the same frequency, especially in terms of a system with less spread gain, signals of users in adjacent cells cause strong interference to the local cell signals. As a result, the single code-set channel estimation method can not meet the channel estimation requirement in these cases.

On the whole, for the time-slotted CDMA cellular mobile communication system where multiple code-channels of adjacent cells operate in the same frequency, it is necessary to provide a better channel estimation method as the single code-set channel estimation method is often unable to meet the requirements of the system performance.

SUMMARY OF THE INVENTION

Object of the invention is to provide a multiple code-set channel estimation method in a time-slotted CDMA mobile communication system in view of the situation where there are response signals to multiple code-sets of channel estimation in order to achieve a combined multiple code-set channel estimation and improve performance of the single code-set channel estimation.

The invention is implemented with the following technical scheme.

A multiple code-set channel estimation method in a time-slotted CDMA system, comprising, A. performing the single code-set channel estimation of the received signal of each code-set, respectively, to obtain an original channel estimate, and deciding whether the desired iterative times are reached; if yes, outputting the result of each single code-set channel estimation; otherwise, going to Step B;

B. performing limited time decision for the original channel estimates to retain tap values of channel estimation for response signals that meet a certain condition; recovering the interference caused by response signals of each code-set by means of the said tap values of channel estimates; canceling the interference caused by response signals of other code-sets from the received signals of each code-set to obtain clean signals of each code-set; taking the clean signals of each code-set as the said received signals of each code-set; and returning to Step A.

Regarding the responses to channel estimation codes of multiple code-sets, the invention presents an iterative channel estimation method for multiple code-sets based on decision feedback process of limited time taps. It provides not only the solution to channel estimation of multiple code-sets at the same time, but it also provides a method for improving the single code-set channel estimation. In the prior art of single code-set channel estimation, all components of a response signal including responses to midambles of other code-sets are processed as Gaussian noise except responses to the local code-set. While, in this invention, information from multiple code-sets is fully employed, main interference among multiple code-sets is canceled, and iterative estimation is carried out on clean signals of each code-set. Accordingly, performances of the channel estimation are greatly improved. The method of this invention is a process of making decision and feeding back the clean signals for iterative operation based on the single code-set channel estimation. The calculation load of this method is usually not heavy when there are not too many code-sets. This method is especially useful for a multi-antenna system as it provides a simple and effective way to improve the performance of channel estimation with much lower complexity in calculation compared with the method using spatial characteristics of signals. For a single antenna system, this invention provides a method that can improve the performance of channel estimation.

The invention can be used not only for improving the performance of single code-set channel estimation, but also for obtaining channel estimation of multiple code-sets at the same time. The method provided by this invention is of great significance for normal operation of a time-slotted CDMA system in adjacent cells working in the same frequency, it lays down a foundation of channel and interference measurement for various techniques related with application of smart antennas, radio resource management, and measurement of physical layers, and further develops the technology of the time-slotted CDMA system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The invention will be described hereinafter in more detail with reference to the accompanying drawings.

The interference on midamble response of the local cell caused by adjacent cells having the same frequency mainly comes from midamble response of other code-sets that are synchronized with the local cell. Besides, it is possible that midamble response signals of multiple code-sets in some other applications are overlapped when the powers thereof are approximated. In this case, the received signals of midambles are called response signals of channel estimation codes of multiple code-sets, or briefly multi-code-set signals. With the existence of multi-code-set signals, it is possible not only to obtain channel estimates of multiple code-sets at the same time but also to improve the performance of single code-set channel estimation.

Figure 1:
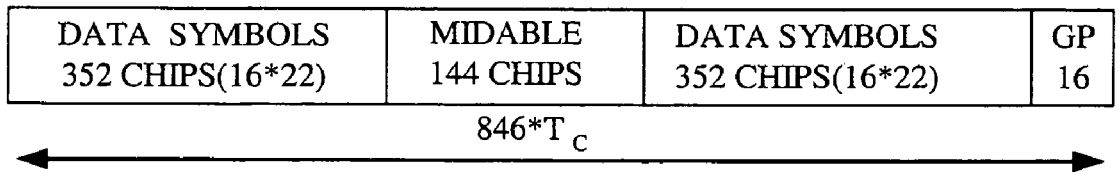
FIG. 1 shows the burst structure in a TD-SCDMA system.
Figure 2:
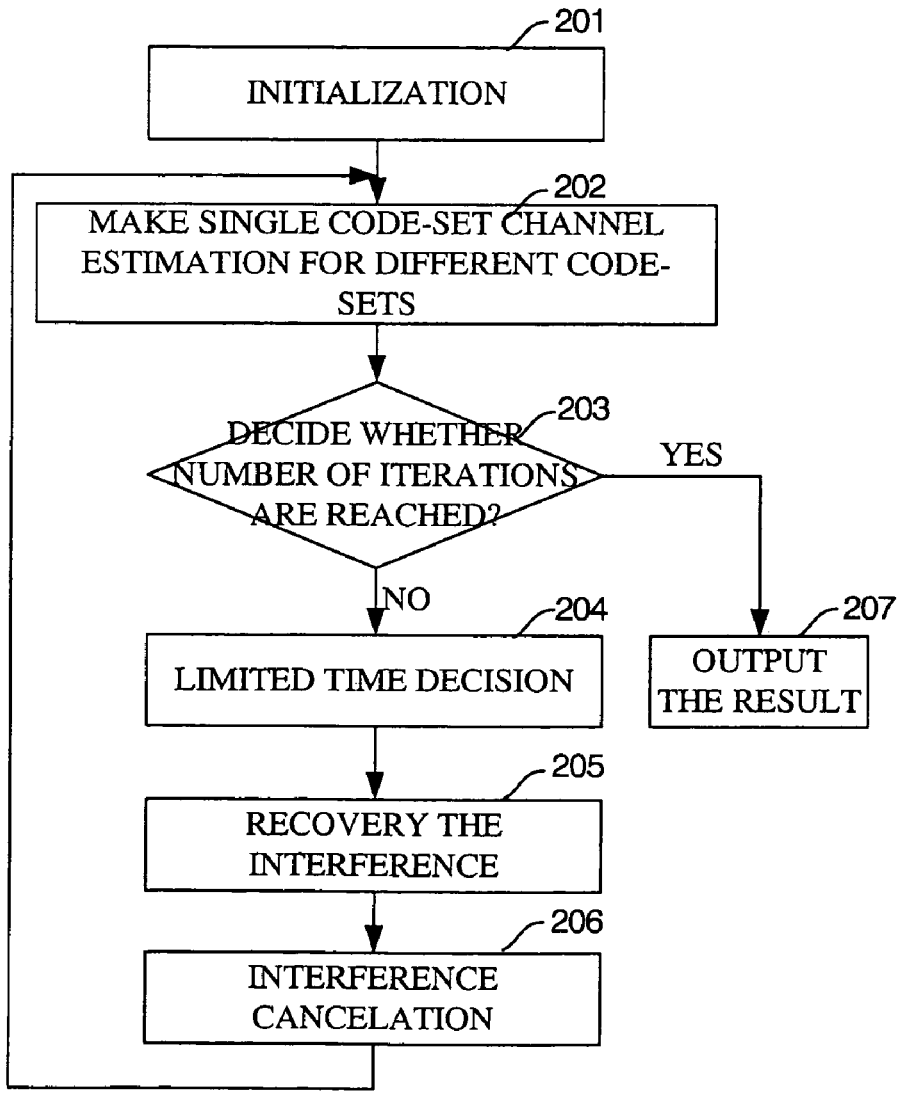
FIG. 2 is the flowchart for multiple code-sets channel estimation of this invention.

In this invention, a limited time decision process is carried out for the channel estimates of a single code-set, that is, a limited number of taps with stronger signal response is retained and used to recover the interference from other code-sets. The recovered interference is then canceled to obtain clean signals of each code-set. Perform the single code-set channel estimation for the clean signals of each code-set, and repeat the above process until the required number of iterations is reached, then output the channel estimates. The specific steps are shown in FIG. 2 and described as follows.

First step, step 201, initialization:

Since it is impossible to separate the received signals of a single code-set from received signals of multiple code-sets before the channel estimation, set the inputs for each single code-set channel estimator as the total received signal of multiple code-sets.

Second step, steps 202 and 203, channel estimation for single code-set:

Perform single code-set channel estimation, respectively, for different code-sets by using the single code-set channel estimator to obtain an original channel estimate of each code-set;

Decide whether the number of iterations has been reached. If yes, stop iteration operation and output the channel estimate (Step 207); otherwise go to the next step.

Third step, step 204, limited time decision.

Process the original channel estimates: only the values of taps with stronger response signals are retained while other taps are set to zero.

Fourth step, step 205, recovery of interference:

Recover the interference caused by response signals of each code-set by using the processed channel estimates, i.e. multiply the circle matrix of a code-set with the channel estimates processed by limited time decision, the product of which is the interference signal of the said code-set.

Fifth step, step 206, interference cancellation:

Subtract the recovered interference caused by the response signals of other code-sets from the total signal of multiple code-sets to obtain clean signals of each code-set. Then use the clean signals of each code-set as the input signals for the estimator of each code-set and go to the second step to perform channel estimation for single code-set until the iterative times have been reached. Finally, output the channel estimates.

Said limited time decision process may be implemented by one of the following methods:

The signal-to-noise ratio threshold method: set a signal-to-noise ratio threshold and values of taps where the signal-to-noise ratio of the original channel estimate is greater than the threshold are retained while values of other taps are set to zero.

The power/amplitude threshold method: set a power/amplitude threshold and values of taps where the power/amplitude of the original channel estimate is greater than the threshold are retained while values of other taps are set to zero.

The tap number threshold method: set a threshold of tap number, sort the taps of the original channel estimates according to the power/amplitude values thereof, retain the number of taps as set by the tap number threshold with the power/amplitude values of the retained taps being the highest, and set the values of other taps to zero.

The above limited time decision process is not to obtain an accurate channel response but to recover the strong interference caused by response signals of the local code-set. So it is sufficient to retain a small number of taps. Besides, the number of taps retained can be dynamically defined. At the beginning of the iteration less number of taps may be taken. As the required number of iteration increases, a larger number of taps may be used. Alternatively, at the beginning of the iteration a higher threshold of signal-to-noise ratio may be set. Along with the increased number of iterations, a lower threshold of signal-to-noise ratio may be set. Or at the beginning of the iteration a higher threshold of power/amplitude value may be set. Along with the increased number of iterations a lower threshold of power/amplitude value may be set.

For the interference cancellation, a complete or partial cancellation of interference can be carried out. When a partial cancellation is carried out, the interference component is multiplied with a coefficient. The coefficient may be gradually increased along with the increased number of iterations.

When there exists a deviation of synchronization between signals of different code-sets, multi-code-set signals may be processed by one of the following two solutions:

One solution is to take signals of different code-sets as signals that are still strictly synchronized, use the data sampled at the same sampling points for channel estimation, interference recovery and cancellation. The shift in the corresponding relationship between channel estimation and a code channel caused by the time deviation is only taken into account when the final channel estimate is used.

The other solution is to carry out signal processing based on the synchronization time of each different code-set and channel estimation, interference recovery and cancellation are carried out at different time deviation for different code-sets. In this case, the interference being cancelled is the interference caused by other code-sets at the overlapped time with the code-set. With this solution, the channel estimate can be put into use directly.

The channel estimation method is hereinafter further described by taking as an example the specific processing of received signals of two different code-sets.

Suppose that the midamble response signals of two code-sets belonging to two cells are respectively the strongest among the received signals of multiple code-sets by a receiver at the boundary of the two cells. The corresponding system matrixes of the two code-sets are $G_1$ and $G_2$, respectively, and the channel response vectors thereof are $h_1$ and $h_2$, respectively. Then the received midamble response can be expressed as:

$$e_{mid} = \sum_{m=1}^{2} G_m h_m + n_0 \quad (8)$$

where $n_0$ is different from n in equation (3) and represents all noises other than those caused by multi-code-set signals. For any code-set $G_m$ (m=1,2), the received midamble response can be also expressed as:

$$e_{mid} = G_m h_m + n_m \quad (9)$$

The relationship between $n_m$ and $n_0$ is:

$$\begin{cases} n_1 = G_2 h_2 + n_0 = I_2 + n_0 \\ n_2 = G_1 h_1 + n_0 = I_1 + n_0 \end{cases} \quad (10)$$

where $I_m$ represents the interference caused by the response of $m^{th}$ (m=1,2) code-set.

The iterative times and m, the number of the code-sets can be determined by taking into account the algorithm overhead, simulation and test result. In the following embodiment, the number of iterations are set as two, and the steps are as follows.

First step: initialization. Before channel estimation, set the input to each single code-set channel estimator as the total multi-code-set signal received:

$$e_{mid,m} = e_{mid}, \; m=1,2 \quad (11)$$

Second step: single code-set channel estimation. With the channel estimation method for single code-set, the single code-set channel estimator makes the single code-set channel estimation for different code-sets, respectively. According to formula (12), the original channel estimate of each code-set $\tilde{h}_m$ is:

$$\tilde{h}_m = G_m^{-1} e_{mid,m}, \; m=1,2 \quad (12)$$

When $\hat{h}_m$ has been obtained, decide whether the iterative times have been reached; if yes, stop the iteration and output the channel estimate; otherwise go to the next step.

Third step: limited time decision. Process the original channel estimate $\hat{h}_m$ with the signal-to-noise ratio threshold method, and set the signal-to-noise ratio threshold $\epsilon>0$. Then the channel estimate after limited time decision $h'_m$ is obtained by using the measured noise power $\sigma_n^2$ and equation (13). If the square value of norm of the original channel estimate is equal to or greater than the product of the signal-to-noise ratio threshold and the measured noise power, the channel estimation by the single code-set estimator $\hat{h}_m$ is retained and taken as the channel estimate after limited time decision $h'_m$, i.e. values of taps with stronger response at the positions within the limited time are retained while values of other taps are set to zero:

$$h'_{m,i} \begin{cases} \hat{h}_{m,i}; & \|\hat{h}_{m,i}\|^2 \geq \epsilon\sigma_n^2 \\ 0; & \text{else} \end{cases}, i=1,\ldots,P; \quad (13)$$

where P is the number of chips.

The above signal-to-noise ratio threshold may be dynamic values. For instance, in the first iteration the signal-to-noise ratio threshold is $\epsilon=5$ while in the second iteration the signal-to-noise ratio threshold is $\epsilon=3$.

Fourth step: interference recovery. With the channel estimate after limited time decision, recover the interference caused by response of each code-set by formula (14).

$$I'_m = G_m h'_m \quad (14)$$

Fifth step: interference cancellation. As shown in equation (15), the clean signal $e_{mid,m}$ of the code-set $G_m$ is obtained by subtracting the recovered interference $I'_m$ of all other code-sets from the total multi-code-set received. In this embodiment, the clean signal of the first code-set $e_{mid,1}$ is obtained by subtracting the interference caused by the response of second code-set $I'_2$ from the total muti-code-set signal received; and the clean signal of second code-set $e_{mid,2}$ is obtained by subtracting the interference caused by the response of the first code-set $I'_1$ from the total multi-code-set signal received.

$$e_{mid,m} = e_{mid} - \sum_{\substack{j=1 \\ j\neq m}}^{M} I'_j = e_{mid} - \sum_{\substack{j=1 \\ j\neq m}}^{M} G_j h'_j \quad (15)$$

After $e_{mid,m}$ has been obtained, go to the second step to continue the iteration until the iterative times are reached.

The above interference cancellation is a complete cancellation. A partial cancellation can be carried out as well with the following equation:

$$e_{mid,m} = e_{mid} - \sum_{\substack{j=1 \\ j\neq m}}^{M} \beta_j I'_j = e_{mid} - \sum_{\substack{j=1 \\ j\neq m}}^{M} \beta_j G_j h'_j \quad (16)$$

where $0\leq\beta_j\leq 1$. At the beginning of the iteration $\beta_j$ may be a smaller value, such as 0.3. Along with the increasing of the iterative times $\beta_j$ may increase gradually. At the last iteration, the value of $\beta_j$ may be 1.

Figure 3:
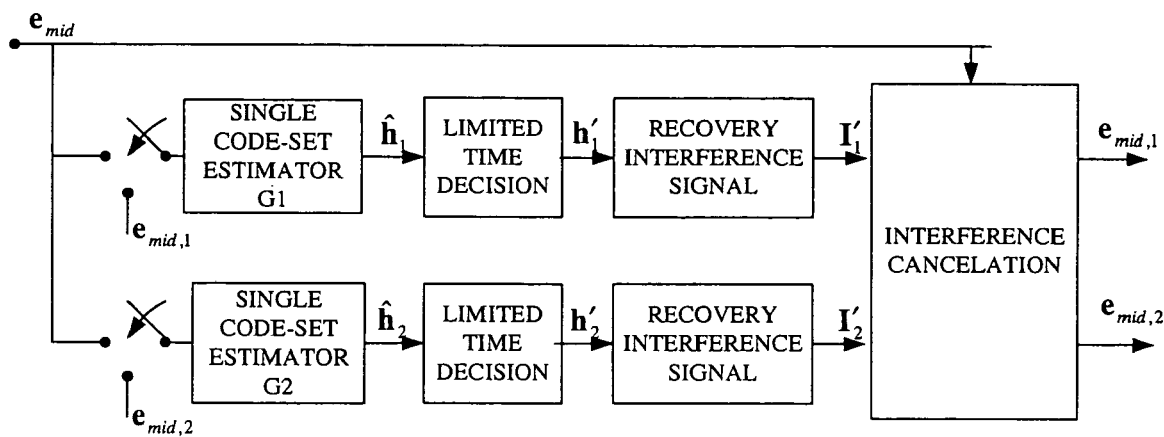
FIG. 3 is a schematic diagram illustrating the signal-processing in the multiple code-sets channel estimation of an embodiment of this invention.

The above embodiment can be shown as FIG. 3. During initialization, the received total multi-code-set signal is inputted to each single code-set estimator to obtain the original channel estimate of each code-set. Then the estimate is processed successively by the steps of single code-set channel estimation, limited time decision, interference recovery and cancellation to obtain the clean signals of each code-set $e_{mid,m}$, which are inputted thereafter to the single code-set estimators, respectively. Repeat the steps of single code-set channel estimation, limited time decision, interference recovery and cancellation, until the number of iterations is reached. Then output the channel estimates from the signal code-set estimators.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multiple code-set channel estimation method in a time-slotted CDMA system, comprising,
   A. performing single code-set channel estimation of a received signal of each code-set, respectively, to obtain an original channel estimate, and deciding whether desired iterative times are reached; if yes, outputting the channel estimate of each single code-set; otherwise, going to Step B;
   B. performing limited time decision for the original channel estimates to retain tap values of channel estimation that meet a certain condition; recovering the interference caused by response signals of each code-set according to the retained tap values; canceling the interference caused by response signals of other code-sets in the received signal of each code-set to obtain a clean signal of each code-set; taking the clean signal of each code-set as the said received signal of each code-set; and returning to Step A.

2. The multiple code-set channel estimation method according to claim 1, wherein the said received signal of each code-set in Step A is, in the first iteration, the received total multi-code-set signal.

3. The multiple code-set channel estimation method according to claim 1, wherein the limited time decision comprises: setting a threshold for a performance parameter of channel estimation; deciding whether the performance parameter of a tap value of the original channel estimate is no less than the threshold; if yes, retaining the value of the tap; otherwise setting the value of the tap to zero.

4. The multiple code-set channel estimation method according to claim 3, wherein the limited time decision further comprises: setting the threshold of a performance parameter as dynamically decreasing along with increasing of the iterative times, and
   the said performance parameter is a signal-to-noise ratio or a power/amplitude value.

5. The multiple code-set channel estimation method according to claim 1, wherein the limited time decision comprises: setting a threshold of tap numbers, sorting power/amplitude values of all taps, retaining values of the threshold number of taps with the power/amplitude values thereof being the highest, and setting values of other taps to zero.

6. The multiple code-set channel estimation method according to claim 5, wherein the threshold of tap numbers is dynamically increased along with the increased number of iterations.

7. The multiple code-set channel estimation method according to claim 1, wherein said recovering the interference comprises multiplying a circle matrix corresponding to a code-set with the channel estimation of the said code-set after limited time decision to obtain a product which is the interference of the said code-set.

8. The multiple code-set channel estimation method according to claim 1, wherein the said step for obtaining a clean signal comprises:
  canceling completely the interference of other code-sets in the received signal of each code-set, or
  multiplying the interference of other code-sets with a coefficient that is not less than zero and not greater than one to obtain a partial interference, and then canceling partially the interference in the received signal of each code-set.

9. The multiple code-set channel estimation method according to claim 8, wherein the coefficient increases along with the increased number of iterations.

10. The channel estimation method according to claim 1, further comprising: taking the received signal with synchronization deviation as a fully synchronized signal, and performing a channel estimation using data sampled at the same sampling points; or
  performing a channel estimation of the received signal with synchronization deviation based on a synchronization period and time deviation of each code-set, and canceling the interference of other code-sets caused in the overlapped time period of the code-sets to obtain the clean signal of each code-set.

* * * * *